(12) United States Patent
Dubois et al.

(10) Patent No.: US 6,590,832 B2
(45) Date of Patent: Jul. 8, 2003

(54) VIBRATOR AND METHOD OF EXPLORING A MATERIAL MEDIUM BY MEANS OF VERY LOW-FREQUENCY ELASTIC VIBRATIONS

(75) Inventors: Jean-Claude Dubois, Lapleau (FR); Marc Becquey, Rueil-Malmaison (FR)

(73) Assignee: Institut Francais Du Petrole, Rueil-Malmaison cedex (FR)

( * ) Notice: Subject to any disclaimer, the term of this patent is extended or adjusted under 35 U.S.C. 154(b) by 91 days.

(21) Appl. No.: 09/774,718

(22) Filed: Feb. 1, 2001

(65) Prior Publication Data

US 2001/0012236 A1 Aug. 9, 2001

(30) Foreign Application Priority Data

Feb. 1, 2000 (FR) .............................................. 00 01271

(51) Int. Cl.[7] .............................................. G01S 15/00
(52) U.S. Cl. ...................................................... 367/92
(58) Field of Search .......................... 367/36, 92, 138

(56) References Cited

U.S. PATENT DOCUMENTS

| 3,786,405 A | | 1/1974 | Chramiec ................... 340/3 R |
| 4,216,537 A | * | 8/1980 | Delignieres ................. 367/106 |
| 5,025,423 A | | 6/1991 | Earp ........................... 367/137 |
| 5,719,823 A | * | 2/1998 | Earp ........................... 367/138 |

FOREIGN PATENT DOCUMENTS

| EP | 0818773 | 1/1998 | .......... G10K/15/02 |

* cited by examiner

Primary Examiner—Gregory J. Toatley, Jr.
(74) Attorney, Agent, or Firm—Antonelli, Terry, Stout & Kraus, LLP

(57) ABSTRACT

Vibrator comprising a single vibration generator coupled with the medium by a coupling element and means for controlling the generator, suited to apply thereto, on each emission, a single pilot signal obtained by combination of at least two signals of different frequencies (f1, f2), fixed or preferably variable within at least partly separate frequency bands, and non-linear elastic transmission means suited to generate in the medium vibrations at a frequency depending on the frequency difference of the two vibrational signals. The exploration method comprises using the vibrator in order to emit very low-frequency vibrations in the medium reception by pickups (R) of the waves reflected by the medium in response to the vibrations emitted and recording thereof, and selection by correlation of the vibrational signals with a synthetic signal whose frequency is connected with the frequency difference of the signals forming the pilot signal.

38 Claims, 9 Drawing Sheets

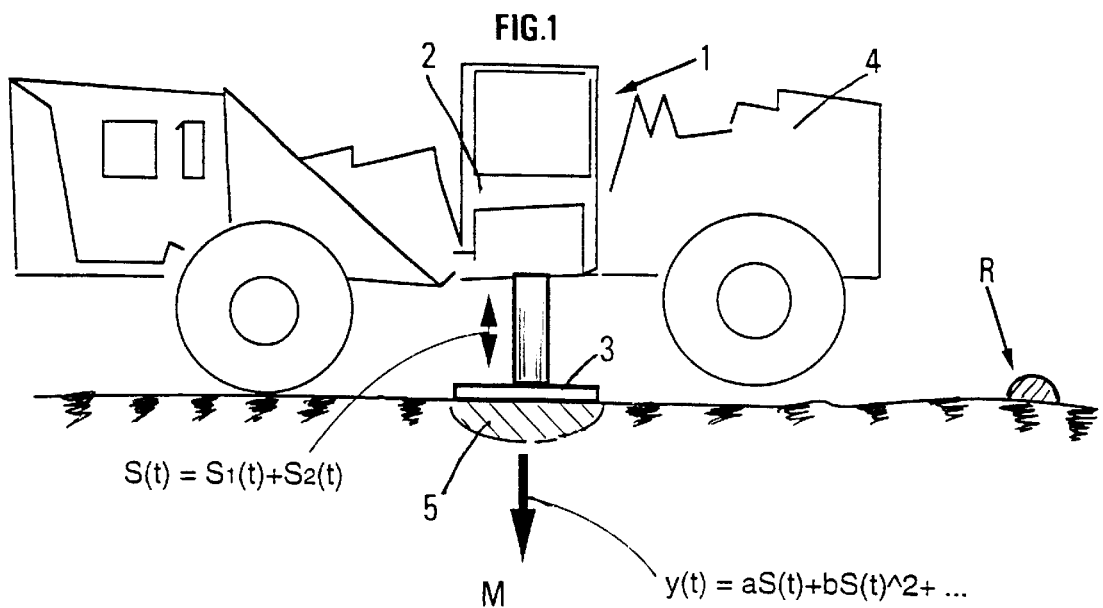
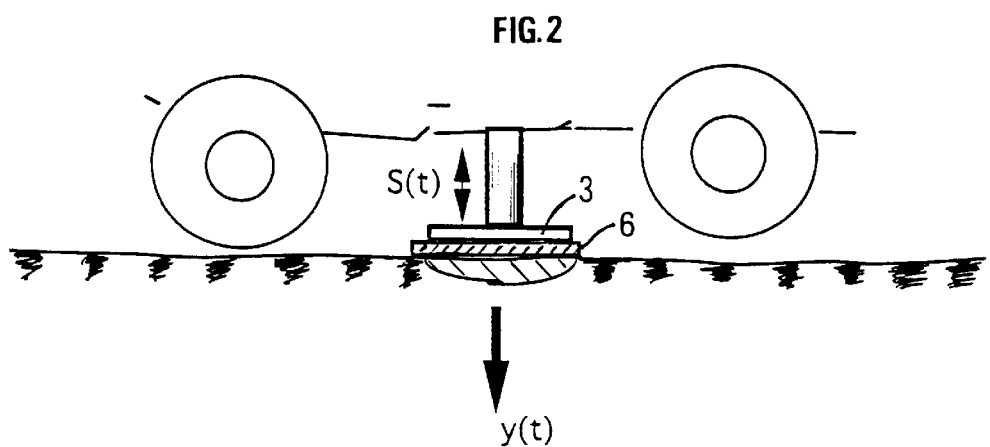
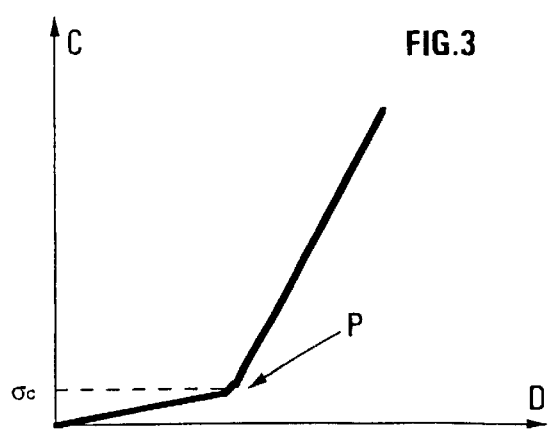
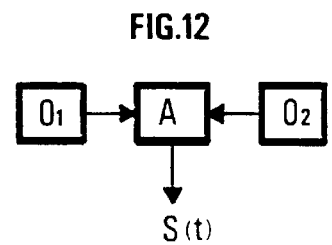

VIBRATOR AND METHOD OF EXPLORING A MATERIAL MEDIUM BY MEANS OF VERY LOW-FREQUENCY ELASTIC VIBRATIONS

FIELD OF THE INVENTION

The object of the present invention is a vibrator suited to emit very low-frequency vibrations and a method using this vibrator in order to explore a material medium with very low-frequency vibrations.

The vibrator according to the invention can be used in many fields where very low-frequency vibrations are required, notably for exploration of an medium by means of elastic waves, notably for seismic prospecting in geologic structures, or for structure tests, in civil engineering for example, etc.

BACKGROUND OF THE INVENTION

Vibrators generally comprise a vibration generator of any type: electro-hydraulic, with eccentric weights, with a piezoelectric motor, etc., a reactive mass and a transmitter or coupling element such as a plate, a bell, a rod, etc., in contact with the medium where the waves are propagated, in order to exert thereon a constant force within a certain range of the frequency excursion. The motion of the coupling element is controlled by a pilot signal. The coupling element can be placed on the surface of the medium or in contact with the walls of a hole or of a cavity drilled in the medium.

The frequency excursion of the vibrator is limited on the low frequency side as well as on the high frequency side by certain technical contingencies. Concerning the upper limit, it is reduced on account of the resonance of the acoustic cavity formed by the plate and the first interface between layers of different impedances. It therefore depends on the structure of the medium. The practical limit in the ground is for example at frequencies of the order of 180 Hz for which the cavity has a sufficient quality coefficient to break the phase control of the plate. The motion of the plate being adjusted to exert a constant force, the displacement of the mass exerting this force by reaction on the plate is all the greater as the frequency is low. The lower limit of the possible frequency band is conditioned by the maximum travel of this mass.

A known method allowing to obtain elastic waves at a lower frequency is used in marine applications. It consists in using antennas referred to as parametric antennas by means of which very directional wave beams are emitted at close frequencies in the direction of a common target. Under the energetic action of the two beams, the target reacts in a non-linear way. The intermodulation signals of the two beams are radiated by the target and in particular the signal concerning the frequency difference. The solid medium is here at a distance from the sources of vibration. This method is described in patent FR-2,412,853 filed by the applicant.

Another known method of generating in a solid medium low-frequency elastic waves is for example implemented in patent FR-1,542,973. It essentially consists in causing the vibrations produced by two distinct vibrators to interfere with each other by means of a non-linear mixing element so as to obtain a lower beat frequency. The vibrators are for example vibrators with orbiting weights and the vibrations they generate are applied by means of resonant bars lying on a baseplate resting on the solid medium by means of the non-linear coupling element. This mixing element can for example be a rubber pad or plate, or a surface layer of the ground on which the baseplate rests.

This technique which consists in causing the vibrations of distinct seismic vibrators to interfere with each other actually gives interesting results only when the coupling elements (plates or bells) are nearly butt-jointed. This means that the part of the ground which is subjected to high stresses leading to non-linear operation does not significantly extend beyond the surface occupied by each coupling element. Measurements generally show that the ground depth which determines coupling of a vibrator is only of the order of some decimeters.

SUMMARY OF THE INVENTION

The vibrator according to the invention comprises a single vibration generator and at least one coupling element for transmitting the vibrations to the medium. It is characterized in that it comprises means for controlling the generator, suited to apply thereto (on each emission) a single pilot signal obtained by combination of at least two signals of different frequencies and non-linear elastic transmission means suited to generate in the medium vibrations at a frequency depending on the frequency difference of the two vibrational signals.

The non-linear elastic transmission means include for example a non-linear elastic transmission element interposed between the coupling element and the material medium, which can be made of a material showing a discontinuity in the deformation variation curve according to the compression applied or which can include at least one layer of the medium in contact with the coupling element.

The control means allowing to generate the pilot signal can comprise a fixed-frequency oscillator and an oscillator whose frequency can vary within a determined frequency range, or two variable-frequency oscillators whose frequencies vary within a determined frequency range, with a linear increase or decrease for example.

The control means can for example comprise a first oscillator whose frequency increases linearly within a first frequency range, and a second oscillator whose frequency decreases linearly within a second frequency range different from the first one, or two oscillators whose frequencies vary linearly in the same direction, with different slopes, within two distinct variation ranges.

The method of exploring a material medium by means of very low-frequency vibrations according to the invention comprises emission, by the vibrator, of vibrations in the medium, reception of the signals coming from the medium in response to the vibrations emitted and recording of the signals received.

It is characterized in that at least one composite pilot signal obtained by combination of at least two vibrational signals of different frequencies is applied to at least one vibrator in contact with the medium by means of a coupling element and the signals generated by the vibrator are applied by means of non-linear elastic transmission means (such as a non-linear elastic transmission element and/or a layer of the medium through which the vibrator applies the vibrations generated) so as to generate in the medium vibrations whose emission spectrum includes at least one frequency equal to the frequency difference of the two vibrational signals.

The frequency of one of the signals (or of the two signals) coming into the combination is preferably varied within a frequency band.

According to an embodiment, the vibrator is successively controlled by the first pilot signal and by a second pilot signal obtained by shifting the phases of the two vibrational signals by a quarter of a period.

According to an embodiment, the vibrator is successively controlled by a first pilot signal, a second pilot signal obtained by shifting the phases of the two vibrational signals by a quarter of a period and by two other pilot signals respectively phase-shifted by a half-period in relation to the first and to the second pilot signal.

The method comprises for example selecting from among said signals coming from the medium those which are relative to the frequency difference of the two combined signals, this selection being obtained by correlation with a synthetic signal.

A signal whose frequency is the difference of the two frequencies or depends thereon is for example used as the synthetic signal.

According to an embodiment, the medium where the vibrations are generated being a geologic formation, the elastic waves reflected by the discontinuities of the medium are picked up and combined with signals depending on the signals emitted in order to form a seismic image of the subsoil.

BRIEF DESCRIPTION OF THE DRAWINGS

Other features and advantages of the vibrator and of the associated method will be clear from reading the description hereafter of a non limitative example of implementation within the scope of subsoil seismic prospecting operations, with reference to the accompanying drawings wherein:

FIG. 1 diagrammatically shows a vibrator such as those used for example in onshore seismic prospecting, producing very low frequencies only through the effect of the non-linearity of the surface layer of the ground against which the vibrator leans, FIG. 2 shows a variant of the previous embodiment where the non-linear effect is increased by interposing a non-linear flexible plate, FIG. 3 shows an example of a deformation variation curve of a plate according to the compression applied thereto, with a non-linear discontinuity area.

DETAILED DESCRIPTION

Figure 4A:
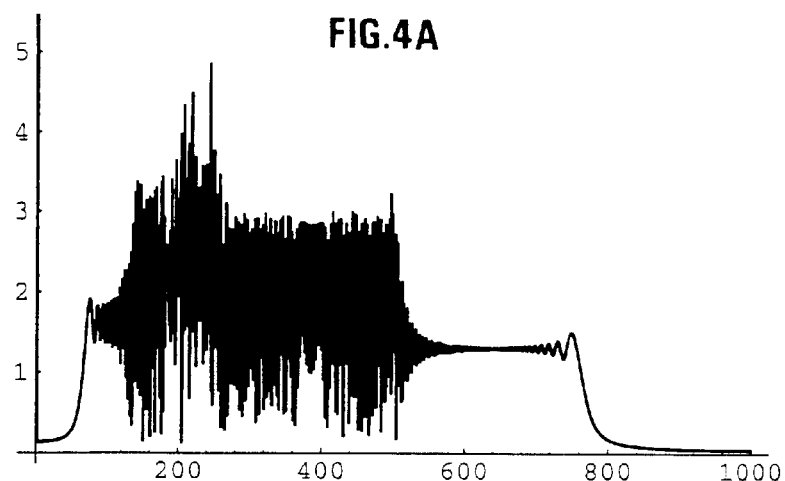
FIGS. 4a, 4b, 4c show various examples of spectra A(f) of seismic signals received in response to an emission in the ground through non-linear elastic means, in the case where the pilot signal is obtained by combination of two signals whose frequencies slide linearly in two frequency bands (sweeps) with 24–96 Hz and 16–64 Hz overlap respectively, for an intermodulation ratio of 50% (FIG. 4a) and 5% (FIGS. 4b, 4c), with a pilot signal of constant amplitude (FIGS. 4a, 4b) and of constant amplitude with amplitude weighting at the edges (FIG. 4c)

The method for generating very low-frequency vibrations, which is the object of the invention, essentially consists in coupling with a propagation medium M, by means of non-linear elastic means, a single vibrator actuated by a composite pilot signal obtained by mixing at least a pair of signals of different frequencies, fixed or sliding within different frequency bands, with or without overlap. This vibrator can be of any type: electro-hydraulic, electromagnetic, piezo-electric, etc.

In the examples given hereafter, we consider the case of an application to onshore seismic prospecting using a vibrator 1 comprising (FIG. 1) a vibration generator 2 of electro-hydraulic type for example, and a baseplate or bell 3. The vibrator is placed on a truck 4. In operation, it is coupled with the ground by application thereon of at least part of the weight of the truck.

The non-linear elastic means can be an unconsolidated surface layer 5 of the ground (FIG. 1). In order to increase the non-linearity if need be, it is possible to insert between coupling element 3 and layer 5 an elastic layer 6 made for example of elastomers containing carbon powder (FIG. 2), which has a non-linear area P (FIG. 3) in its curve of variation of deformation D according to the compression C applied. In this case, the load applied by the truck is adjusted so as to be in this non-linear area.

In response to a signal s(t) applied thereto, these non-linear elastic means produce a complex signal expressed by a development of the type as follows:

$$Y(t) = a.s(t) + b.s^2(t) + c.s^3(t) + \ldots$$

For a sinusoid $s(t)=\sin(2\pi ft)$, the double frequency is generated by the second term, the triple frequency by the third one, etc. The conversion gain is given by ratio b/a or c/a.

In order to obtain a frequency lower than the fundamental frequency, a pilot signal s(t) formed by stacking two signals of different instantaneous frequencies is applied to vibration generator 2: $s(t)=\sin(2\pi f_1 t)+\sin(2\pi f_2 t)$, where $f_2 > f_1$. In response to the composite vibrational signal, the non-linear coupling means also produce the second term:

$$bs^2(t) = b\left(1 - \frac{1}{2}[\cos(4\pi f_1 t) + \cos(4\pi f_2 t)] + \cos[2\pi(f_2 - f_1)t] - \cos[2\pi(f_2 + f_1)t]\right)$$

where, besides the double frequencies of the input signals, their sum and notably their difference, which will allow to extend the signal emitted in the ground to the low frequencies, can also be found. If the frequencies of the two combined signals are, for example, 12 Hz and 10 Hz, a signal of type $b \cos[2\pi(f_2-f_1)t]$ is obtained, whose frequency is 2 Hz, thus much lower than the frequencies that can be obtained in practice with usual vibrators.

This composite signal s(t) is generated by a control module associated with two oscillators O1, O2 (FIG. 12).

Applications to Seismic Prospecting

For seismic prospecting operations, sliding-frequency vibrations are preferably used. Frequencies $f_1$ and $f_2$ are therefore varied within different frequency ranges: $f_{1min} < f_1 < f_{1max}$, and $f_{2min} < f_2 < f_{2max}$.

The signals reflected by the discontinuities of the medium are picked up by receivers R coupled with the surface and recorded. Through correlation, by a suitable synthetic pilot pseudosignal, of the seismic signals received, it is also possible to produce an impulse corresponding to each one of the following spectrum ranges:

Frequency band double that of the first signal (correlation by a signal whose instantaneous frequency is 2 $f_1$): between 2 $f_{1min}$ and 2 $f_{1max}$.

Frequency band double that of the second signal (correlation by a signal whose instantaneous frequency is 2 $f_2$): between 2 $f_{2min}$ and 2 $f_{2max}$.

Frequency band sum of the frequencies of the two base signals (correlation by a signal whose instantaneous frequency is ($f_1+f_2$)): between ($f_{2min}+f_{1min}$) and ($f_{2max}+f_{1max}$).

Frequency band difference of the frequencies of the two base signals (correlation by a signal whose instantaneous frequency is ($f_2-f_1$): between ($f_{2min}-f_{1min}$) and ($f_{2max}-f_{1max}$).

We thus have a frequency synthesis possibility where selection is made by correlation. The quality of the result of this correlation depends on the amplitude and on the attribute of the other signals which are not <<concerned>> by it but which are present in the same band. This disturbance expresses itself in an increase of the level of the lateral undulations at the correlation peak (correlation noise). It is therefore useful to free the emitted signal (and thus the received signal) of the useless intermodulation products.

Improvement in the Purity of the Signal Sought

By selecting suitable phase changes applied to the two frequency components $f_1$ and $f_2$ of the pilot signal for successive emissions in the same place, the unwanted terms can be eliminated (or greatly attenuated) in order to retain only the term relative for example to the frequency difference. This requires recording of the seismic signals received corresponding respectively to the different pilot signals and stacking prior to correlation.

If we consider the term of the second degree examined above, the purity of the signal corresponding to the frequency difference is improved by emitting successively the pilot signal $s_1(t)=\sin(2\pi f_1 t)+\sin(2\pi f_2 t)$ defined above, then another pilot signal whose two components are phase-shifted by $\pi/2$, i.e. $s_2(t)=\cos(2\pi f_1 t)+\cos(2\pi f_2 t)$, the seismic signals received in response being recorded separately. This term of the second degree becomes for the second pilot signal:

$$bs_2^2(t) = b\left(1 + \frac{1}{2}[\cos(4\pi f_1 t) + \cos(4\pi f_2 t)] + \cos[2\pi(f_2 - f_1)t] + \cos[2\pi(f_2 + f_1)t]\right)$$

By addition of the two recorded sequences, the terms at $2f_1$ and $2f_2$ are eliminated, as well as the term at the sum-frequency ($f_1+f_2$), the term at the difference-frequency ($f_2-f_1$) being kept.

If it is not desired to use the correlation with the fundamental, it is possible to continue in this way by using a sequence of four pilot signals consisting of the previous two and of the same ones whose signs have been changed (phase-shifted by $\pi$). Furthermore, all the odd terms of the initial development are thus eliminated, among which the term at the fundamental frequency which has a great weight, which considerably improves the quality of the signal sought.

Figure 4B:
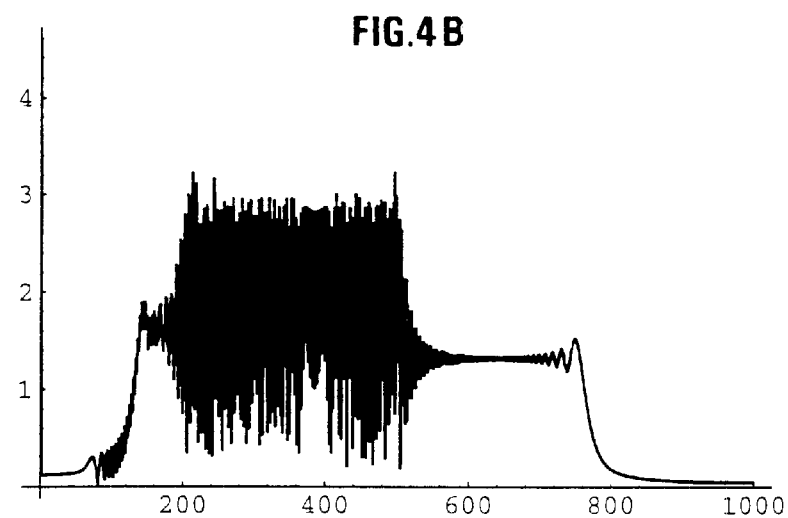
Figure 4C:
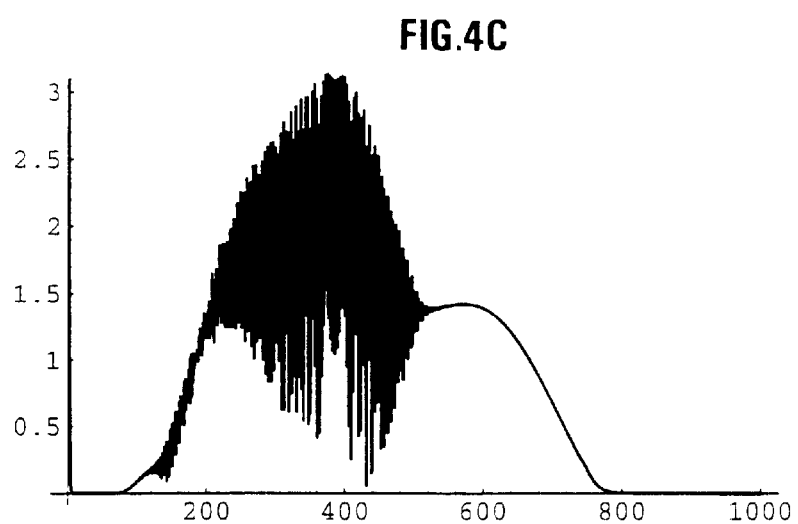
Figure 5A:
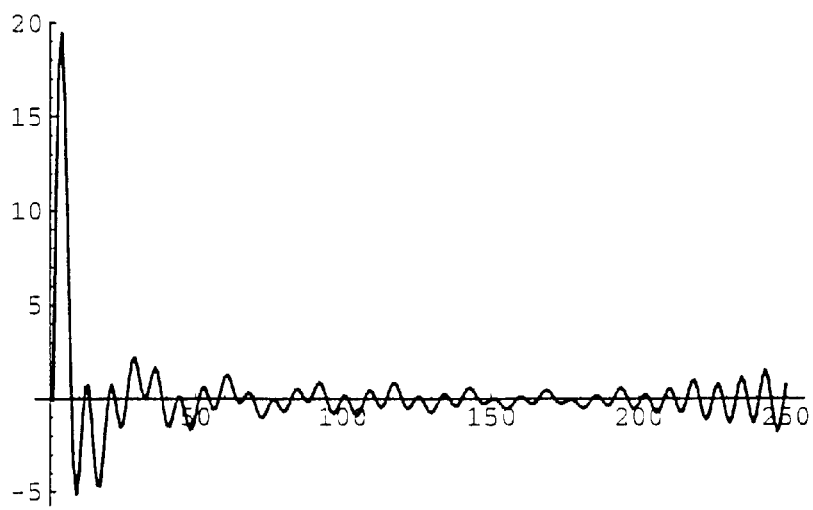
FIGS. 5a to 5c show examples of signals Sc resulting from the correlation of the signals received, whose spectra are illustrated in FIG. 4, by a pilot signal whose frequency is the difference of the sweep frequencies, forming the new pilot signal, FIGS. 6a to 6c respectively show the corresponding spectra B(f) of the signals that are obtained after correlation of signals Sc illustrated in FIG. 5, FIGS. 7a to 7c, 8a to 8c and 9a to 9c are respectively similar to FIGS. 4a to 4c, 5a to 5c and 6a to 6c and illustrate the case where the two frequencies are respectively in the 40–96 Hz and 32–64 Hz bands.
Figure 5B:
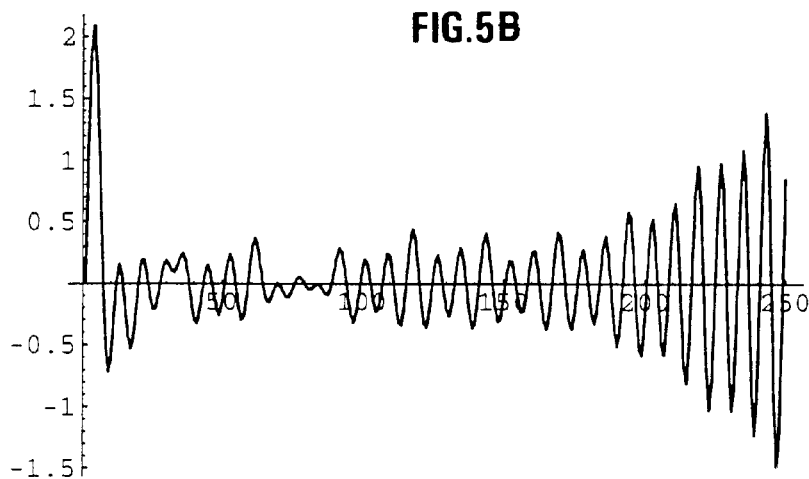
Figure 5C:
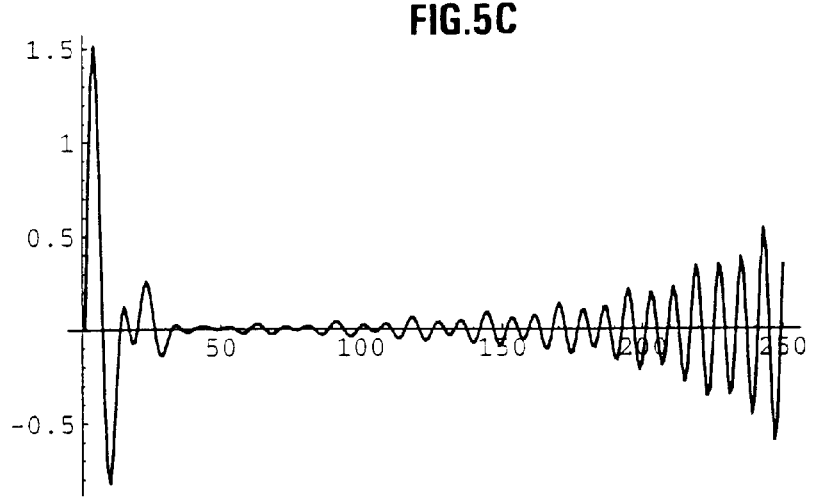
Figure 6A:
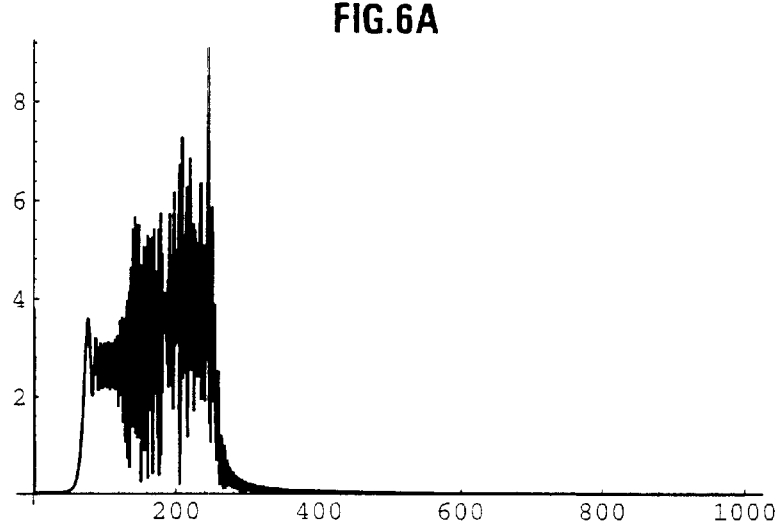
Figure 6B:
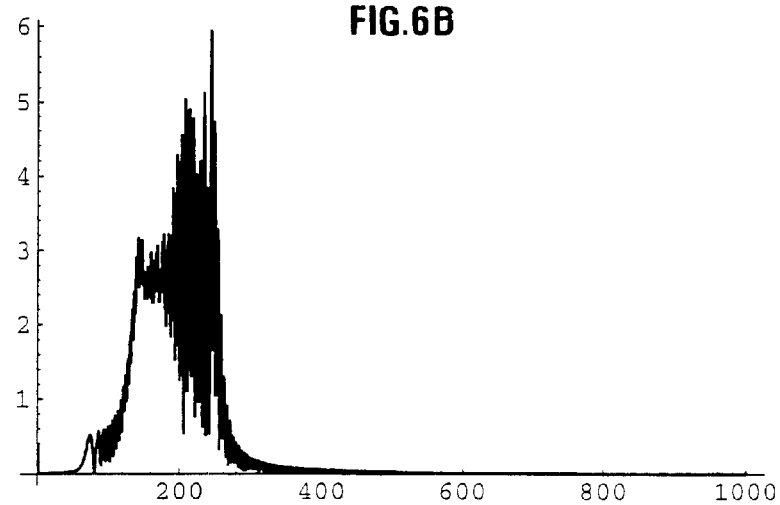
Figure 6C:
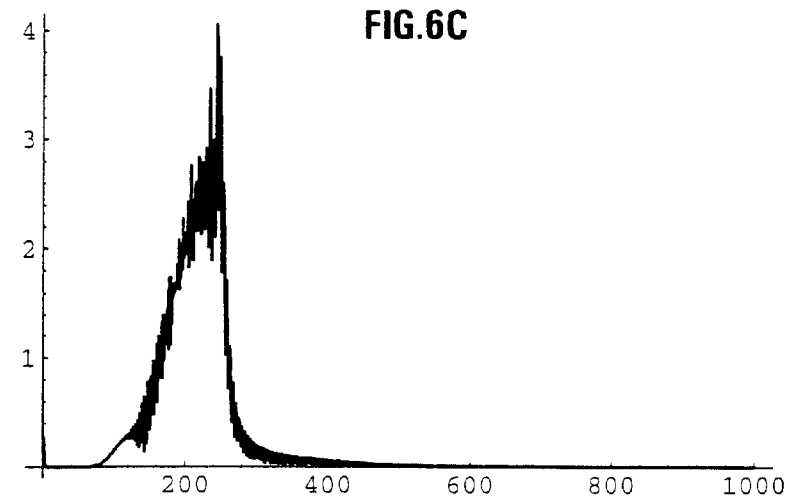
Figure 7A:
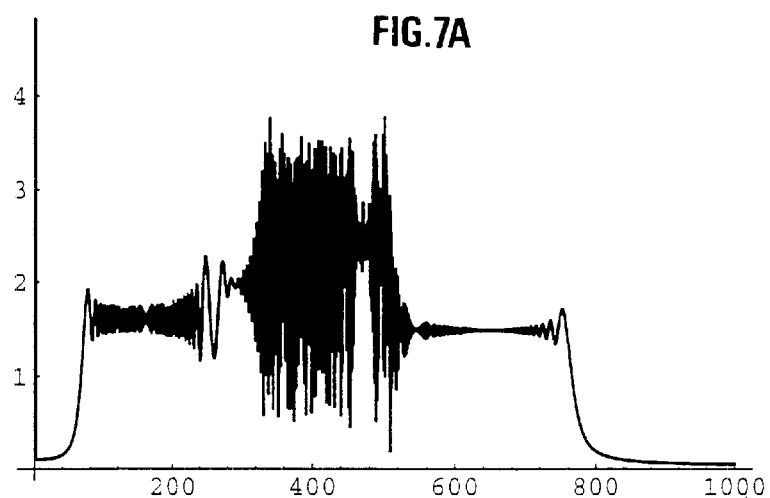
Figure 7B:
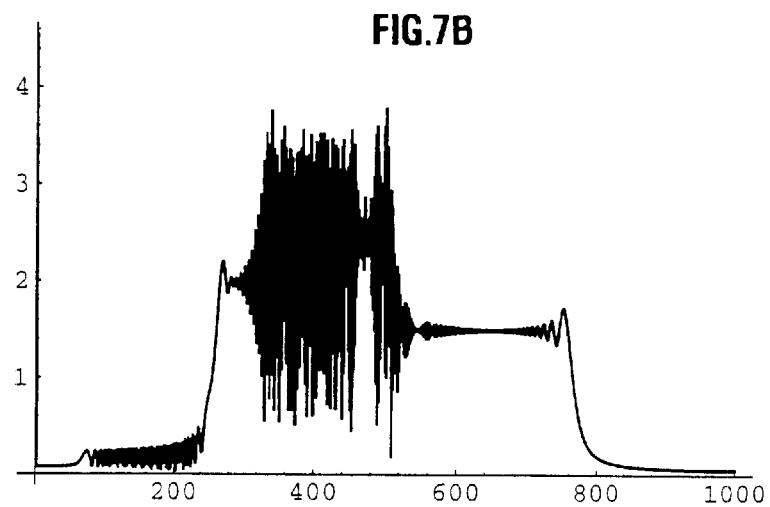
Figure 7C:
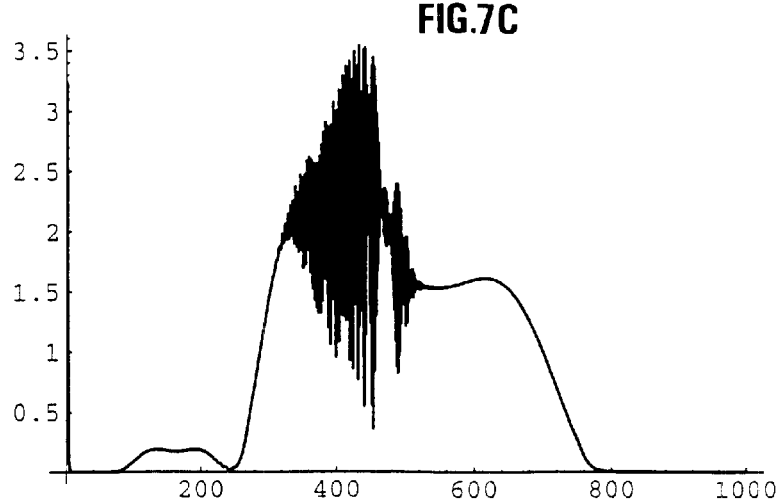
Figure 8A:
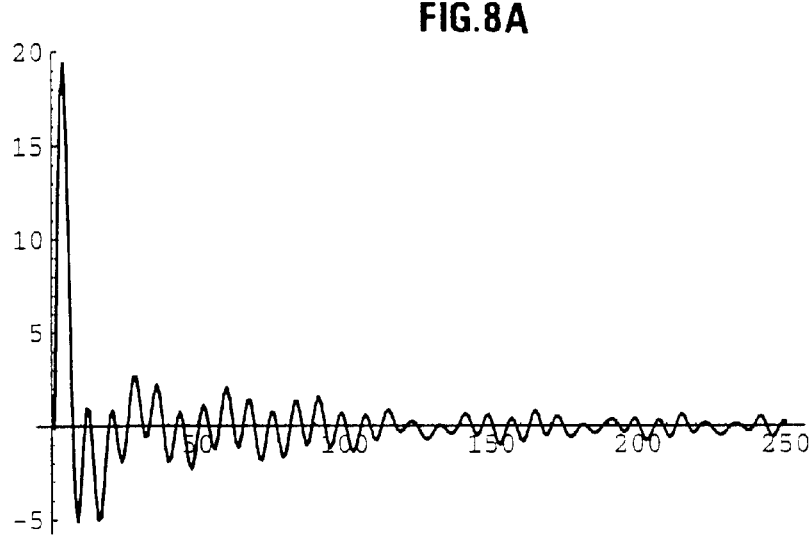
Figure 8B:
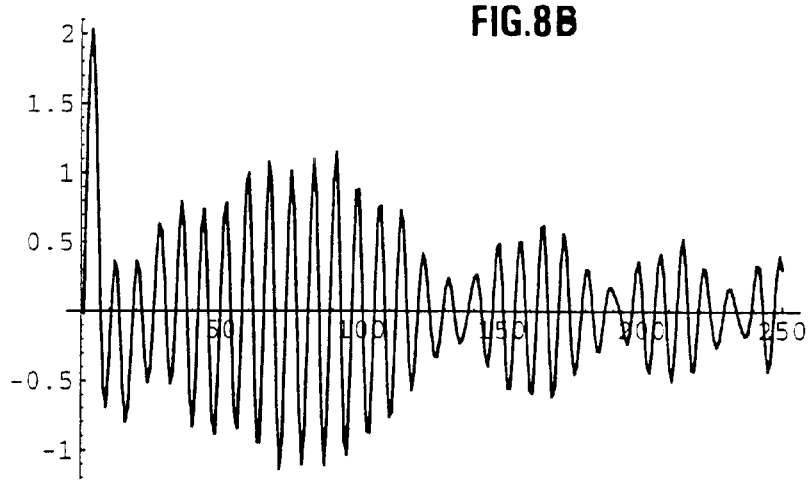
Figure 8C:
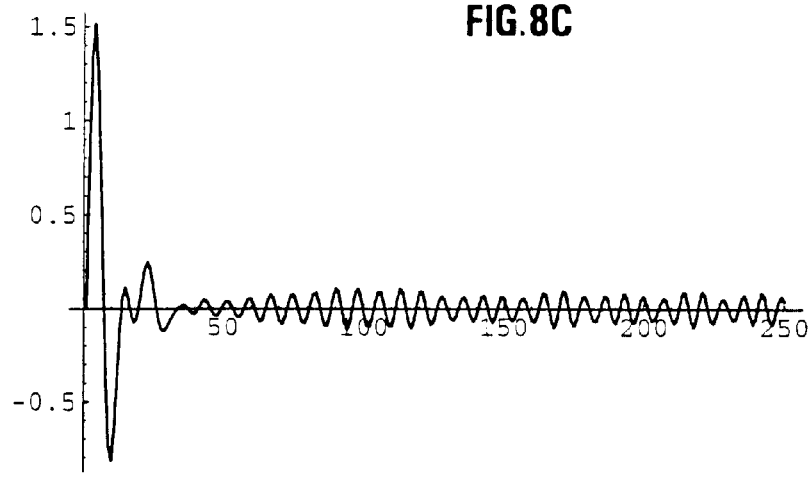
Figure 9A:
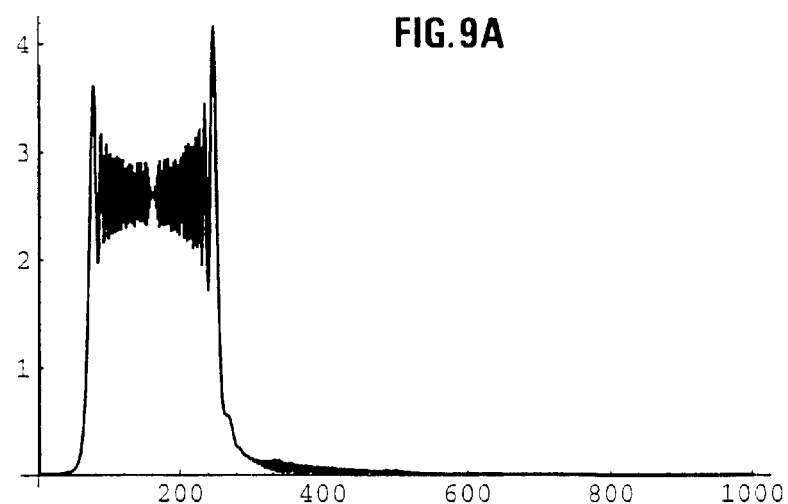
Figure 9B:
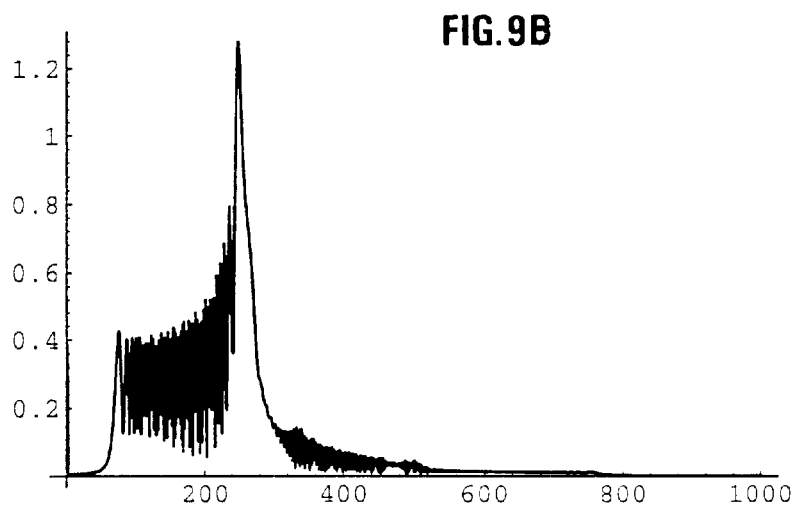
Figure 9C:
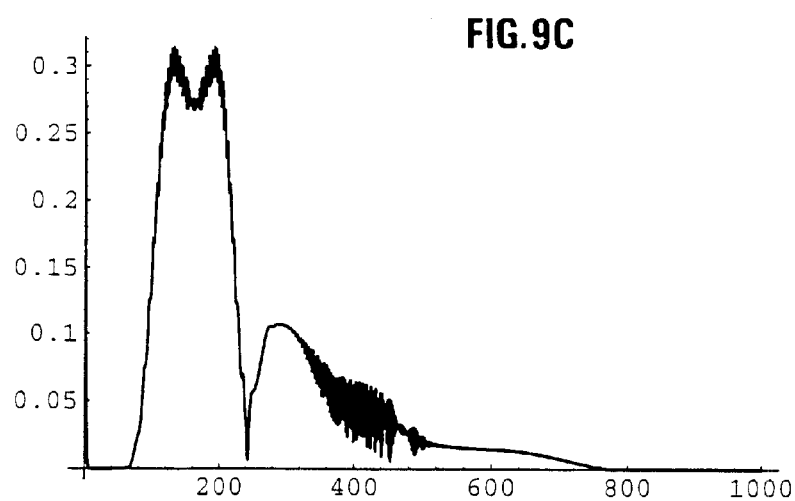

A synthetic example showing the improvement in the purity degree obtained in the case of a pilot signal consisting of the sum of two linear frequency sweeps (from 16 to 64 and from 24 to 96 Hz) on a ground having a non-linearity ratio of order 2 of 5% (compared to 50%) is shown in FIGS. 4 and 5. It shows the improvement in the quality of the correlated signal according to the effort made to eliminate the unwanted terms (FIG. 6).

This procedure can be continued possibly in order to extract an intermodulation product of high order $2\pi(mf_1 \pm nf_2)$ or to suppress the even terms of order $\geq 4$ of the limited development. The practical interest is limited, the energy decreasing all the faster as the order is high.

Various Embodiments of the Method

A—Variants Due to the Emission Sequence

The configurations that can be used for seismic implementation of the vibrator according to the invention result from the combinations described above:

Vibration with a single sweep type with two components which can be used with a synthetic pilot signal at $\Delta f$ (frequency difference) used for correlation of the received signals or $\Sigma f$ (frequencies sum), as well as with the fundamental pilot signal and possibly with the harmonic pilot signals (keeping all the intermodulation products);

Vibration with two successive emissions and two sweep types with two components, one being in quadrature with the other, a variant which can only be used by correlation with a synthetic pilot signal at $\Delta f$ and with the fundamental pilot signal (the other modes being eliminated);

Vibration with four successive emissions and four sweep types with two components (quadrature and sign change $\phi=0, \pi/2, \pi, 3\pi/2$), a variant which can only be used by correlation with a synthetic pilot at $\Delta f$ (the only mode remaining after elimination of the odd terms of the development limited to the first 3 terms).

Figure 10A:
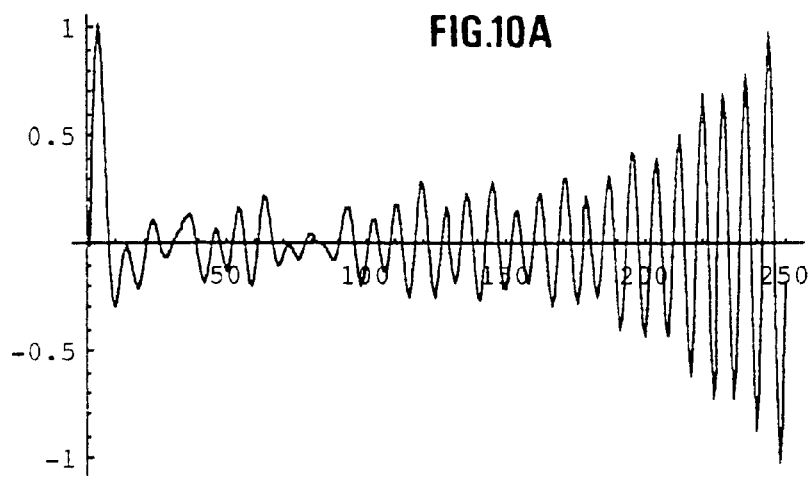
FIGS. 10a to 10c show examples of signals Sc that are obtained by correlating received signals corresponding respectively to a single emission sequence, to a double sequence (two sequences emitted alternately) and to a quadruple sequence (four sequences emitted alternately), FIGS. 11a to 11c respectively show spectra B(f) obtained after the previous correlations, and FIG. 12 diagrammatically shows the control module controlling the vibration generator.
Figure 10B:
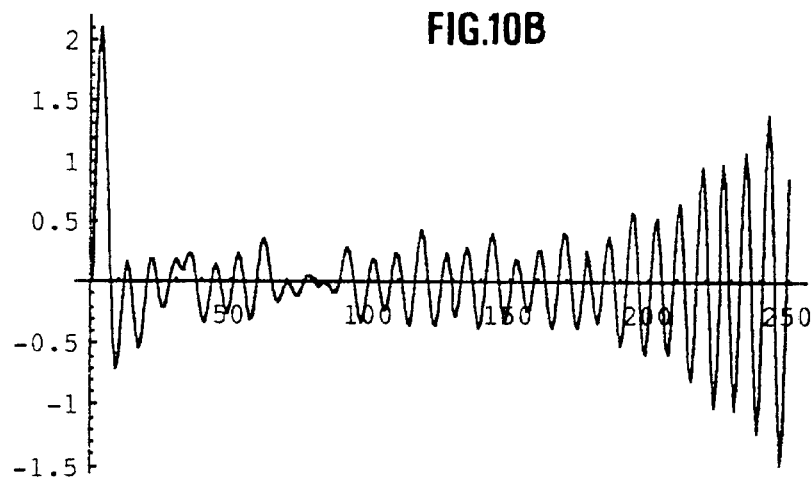
Figure 10C:
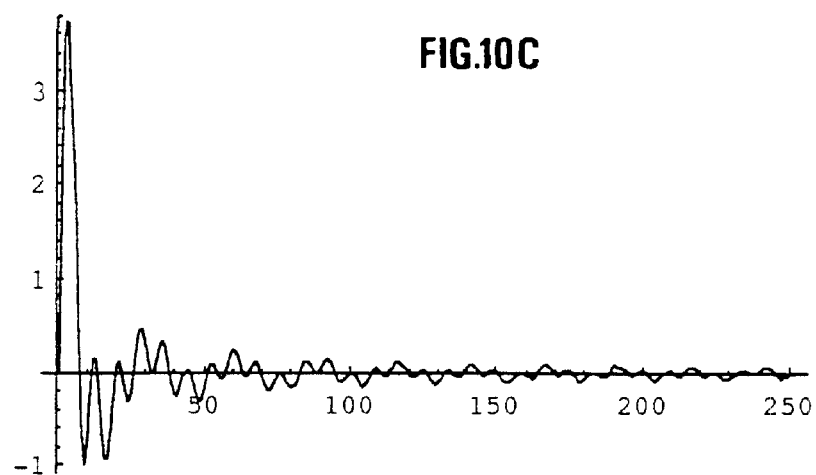
Figure 11A:
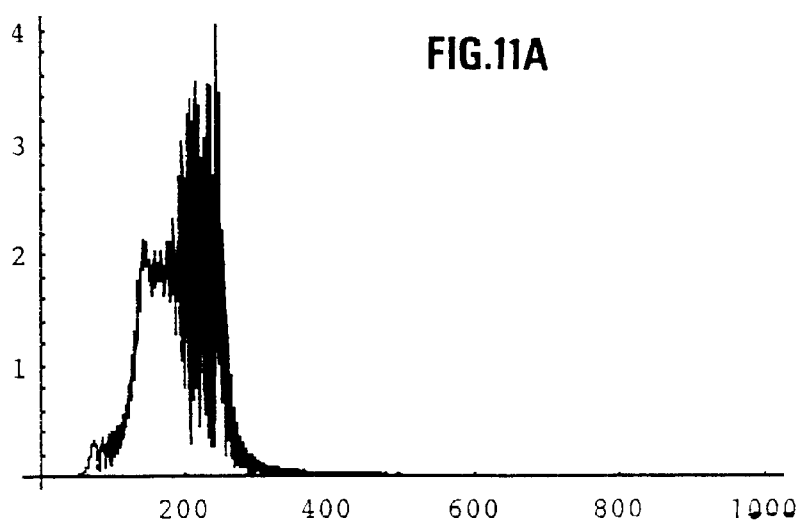
Figure 11B:
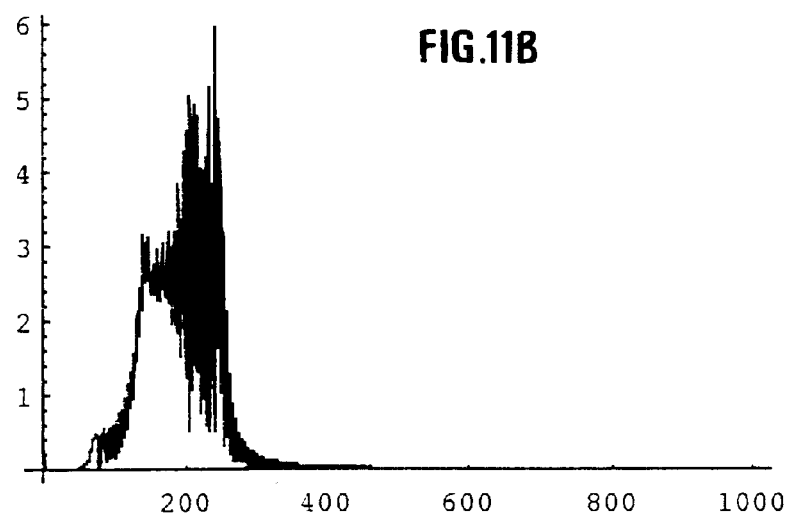
Figure 11C:
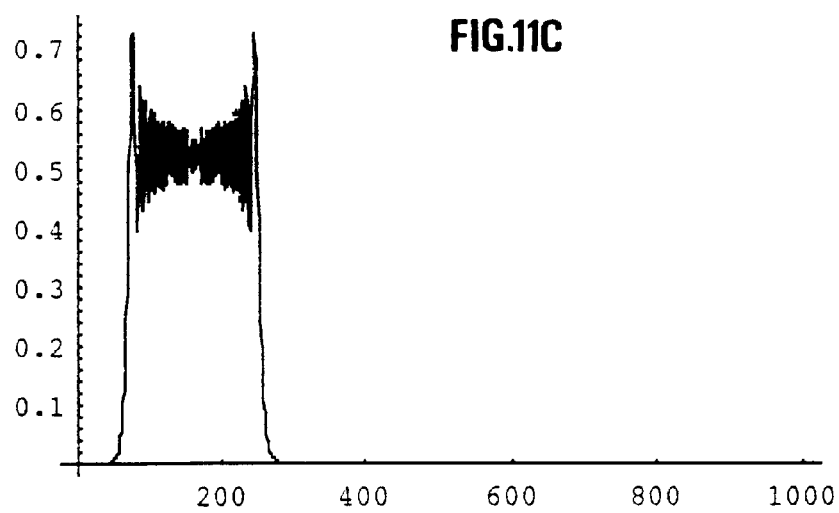

The examples of FIGS. 10 and 11 correspond to different emission sequences where the composite pilot signal is the sum at constant amplitude of two ramps linear in frequency and of different slopes having a duration of 8 s for example, belonging respectively to the two bands ($f_1=24$ Hz to $f_2=96$ Hz) and ($f_3=16$ Hz to $f_4=64$ Hz). The intermodulation ratio is 5% and the synthetic signal used for correlation is the following signal:

$$S_{\Delta f} = \sin\left[2\pi\left(f_1 - f_3 + (f_2 + f_3 - f_4 - f_1)\frac{t}{2T}\right)t\right]$$

between 8 and 32 Hz. In the first case, the emission sequence is single:

$$S(t) = \sin\left[2\pi\left(f_1 + (f_2 - f_1)\frac{t}{2T}\right)t\right] + \sin\left[2\pi\left(f_3 + (f_4 - f_3)\frac{t}{2T}\right)t\right]$$

In the second case (FIGS. 10b, 11b), the emission sequence is double and comprises two successive emissions:

$$S_1(t) = \sin\left[2\pi\left(f_1 + (f_2 - f_1)\frac{t}{2T}\right)t\right] + \sin\left[2\pi\left(f_3 + (f_4 - f_3)\frac{t}{2T}\right)t\right]$$

$$S_2(t) = \sin\left[2\pi\left(f_1 + (f_2 - f_1)\frac{t}{2T}\right)t\right] + \cos\left[2\pi\left(f_3 + (f_4 - f_3)\frac{t}{2T}\right)t\right]$$

In the third case (FIGS. 10c, 11c), the emission sequence is quadruple and comprises successively the previous two signals $S_1(t)$ and $S_2(t)$, followed by $S_3(t)=-S_1(t)$ and $S_4(t)=-S_2(t)$. This simulation, performed for a relatively low conversion rate (5%), shows that in spite of a more complicated sequence such as the quadruple sequence, spectrum B(f) (FIG. 11) is markedly improved.

In cases where an extension to the higher frequencies is desired, it can be noted that the correlation with the pilot signal at the sum frequency $$S_{\Sigma f} = \sin\left[2\pi\left(f_1 + f_3 + (f_1 + f_4 - f_1 - f_3)\frac{t}{2T}\right)t\right]$$

is interesting only if the sampling frequency of the signal is sufficiently high to meet the Nyquist criterion.

B—Variants in the Composition of the Pilot Signals

For pilot signals applied to the plate of the vibrator, the following compositions can be selected:
- a) a fixed frequency outside the variable-frequency range and an increasing variable frequency,
- b) a fixed frequency outside the variable-frequency range and a decreasing variable frequency,
- c) an increasing variable frequency and a decreasing variable frequency such that the difference of their frequencies is never zero,
- d) two increasing or decreasing variable frequencies of different slopes such that the difference of their frequencies is never zero.

Composition variants c) and d) are the most flexible variants.

C—Variants Due to a Particular Selection of the Frequency Boundaries

Judicious selection of the boundaries of the frequency ramps and of the fixed frequencies can for example allow exact juxtaposition of an interesting frequency coverage by allowing, for example, exact juxtaposition of the ranges covered by the correlations at $\Delta f$, $f$ and $\Sigma f$. Using a fixed frequency $f_0$ and a ramp ranging from $f_1$ to $f_2$, with $f_0=f_1$ and $f_2=2 f_1$, a continuous band ranging from 0 to 3 $f_0$ is thus covered. At the processing stage, this implies an amplitude equalization according to the frequency, and three distinct correlations followed by stacking.

Overlap of the frequency bands generally disturbs the quality of the signal provided by the correlation. Using a weighting window is often indispensable to reduce the correlation bounces as shown in FIGS. 4c to 6c and 7c to 9c.

D—Variants Linked with the Pilot Signal Types

Frequency ramps other than linear could also be used without departing from the scope of the invention: logarithmic-variation ramps, coded-variation ramps, random-variation ramps, etc.

What is claimed is:

1. A vibrator intended to generate vibrations in the ground (M), comprising a single vibration generator (2), a control module (A) for the single generator (2) suited to apply thereto, on each emission, a pilot signal obtained by combination of at least two signals of different frequencies (f1, f2), characterized in that it comprises coupling means allowing the vibrator to lean tightly against the ground, and non-linear elastic transmission means suited to generate in the medium vibrations at a frequency depending on the frequency difference (f1, f2) of the two vibrational signals, comprising at least a surface layer of the ground having an acoustic impedance discontinuity in relation to the underlying layers.

2. A vibrator as claimed in claim 1, characterized in that the non-linear elastic transmission means include a non-linear elastic transmission element (6) inserted between the coupling means and the surface layer.

3. A vibrator as claimed in claim 2, characterized in that the non-linear elastic transmission element is made of a material having a discontinuity in the deformation variation curve according to the compression applied by the coupling means.

4. A vibrator a claimed in claim 1, characterized in that control module (A) is intended to generate the pilot signal comprising a fixed-frequency oscillator and an oscillator whose frequency can vary within a determined frequency range.

5. A vibrator as claimed in claim 1, characterized in that the control module intended to generate the pilot signal comprises two oscillators (O1, O2) having each a frequency that is variable within a determined frequency range.

6. A vibrator as claimed in claim 4, characterized in that control module (A) comprises an oscillator (O1) whose frequency increases or decreases linearly in the frequency range.

7. A vibrator as claimed in claim 6, characterized in that control module (A) comprises a first oscillator (O1) whose frequency increases linearly in a first frequency range, and a second oscillator (O2) whose frequency decreases linearly in a second frequency range different from the first one.

8. A vibrator as claimed in claim 7, characterized in that control module (A) comprises two oscillators (O1, O2) whose frequencies vary linearly in the same direction, with different slopes, within two distinct variation ranges.

9. A method of exploring a material medium by means of very low-frequency vibrations with emission of vibrations in the medium, reception of the vibrations coming from the medium in response to the vibrations emitted and recording of the waves received, characterized in that, on each emission, at least one composite pilot signal obtained by combination of at least two vibrational signals of different frequencies is applied to at least one vibrator (1), and the signals generated by each vibrator are applied to the medium by non-linear elastic transmission means (5, 6) so as to generate in the medium vibrations whose emission spectrum includes at least one frequency equal to the frequency difference of the two vibrational signals.

10. A method as claimed in claim 9, characterized in that the frequency of at least one of the signals coming into the combination is varied within a frequency band.

11. A method as claimed in claim 10, characterized in that the respective frequencies of the two signals coming into the combination are varied within two frequency bands.

12. A method as claimed in claim 10, characterized in that the vibrator is successively controlled by a first pilot signal and by a second pilot signal obtained by phase-shifting the two vibrational signals by a quarter of a period.

13. A method as claimed in claim 11, characterized in that the vibrator is successively controlled by a first pilot signal, by a second pilot signal obtained by phase-shifting the two vibrational signals by a quarter of a period and by two other pilot signals respectively phase-shifted by a half-period in relation to the first and to the second pilot signal.

14. A method as claimed in claim 11, characterized in that the signals relative to the frequency difference of the two combined signals are selected from among said signals coming from the medium by correlation with a synthetic signal.

15. A method as claimed in claim 14, characterized in that the frequency of the synthetic signal is the difference of the two frequencies.

16. A method as claimed in claim 10, characterized in that the non-linear elastic transmission means comprise a non-linear elastic transmission element in contact with the material medium.

17. A method as claimed in claim 10, characterized in that the non-linear elastic transmission means include at least one layer of the medium through which the vibrator applies the vibrations generated.

18. A method as claimed in claim 17, characterized in that, the medium where the vibrations are generated being a geologic formation, the vibrations reflected by the geologic formation are picked up, recorded and combined with signals depending on the signals emitted in order to form a seismic image of the subsoil.

19. A vibrator a claimed in claim 2, characterized in that control module (A) is intended to generate the pilot signal comprising a fixed-frequency oscillator and an oscillator whose frequency can vary within a determined frequency range.

20. A vibrator a claimed in claim 3, characterized in that control module (A) is intended to generate the pilot signal comprising a fixed-frequency oscillator and an oscillator whose frequency can vary within a determined frequency range.

21. A vibrator as claimed in claim 2, characterized in that the control module intended to generate the pilot signal comprises two oscillators (O1 and O2) each having a frequency that is variable within a determined frequency range.

22. A vibrator as claimed in claim 3, characterized in that the control module intended to generate the pilot signal comprises two oscillators (O1 and O2) each having a frequency that is variable within a determined frequency range.

23. A vibrator as claimed in claim 21, characterized in that control module (A) comprises an oscillator (O1) whose frequency increases or decreases linearly in the frequency range.

24. A method as claimed in claim 11, characterized in that the vibrator is successively controlled by a first pilot signal and by a second pilot signal obtained by phase-shifting the two vibrational signals by a quarter of a period.

25. A method as claimed in claim 12, characterized in that the vibrator is successively controlled by a first pilot signal, by a second pilot signal obtained by phase-shifting the two vibrational signals by a quarter of a period and by two other pilot signals respectively phase-shifted by a half-period in relation to the first and to the second pilot signal.

26. A method as claimed in claim 12, characterized in that the signals relative to the frequency difference of the two combined signals are selected from among said signals coming from the medium by correlation with a synthetic signal.

27. A method as claimed in claim 13, characterized in that the signals relative to the frequency difference of the two combined signals are selected from among said signals coming from the medium by correlation with a synthetic signal.

28. A method as claimed in claim 11, characterized in that the non-linear elastic transmission means comprises a non-linear elastic transmission element in contact with the material medium.

29. A method as claimed in claim 12, characterized in that the non-linear elastic transmission means comprises a non-linear elastic transmission element in contact with the material medium.

30. A method as claimed in claim 13, characterized in that the non-linear elastic transmission means comprises a non-linear elastic transmission element in contact with the material medium.

31. A method as claimed in claim 14, characterized in that the non-linear elastic transmission means comprises a non-linear elastic transmission element in contact with the material medium.

32. A method as claimed in claim 15, characterized in that the non-linear elastic transmission means comprises a non-linear elastic transmission element in contact with the material medium.

33. A method as claimed in claim 11, characterized in that the non-linear elastic transmission means includes at least one layer of the medium through which the vibrator applies the vibrations generated.

34. A method as claimed in claim 12, characterized in that the non-linear elastic transmission means includes at least one layer of the medium through which the vibrator applies the vibrations generated.

35. A method as claimed in claim 13, characterized in that the non-linear elastic transmission means includes at least one layer of the medium through which the vibrator applies the vibrations generated.

36. A method as claimed in claim 14, characterized in that the non-linear elastic transmission means includes at least one layer of the medium through which the vibrator applies the vibrations generated.

37. A method as claimed in claim 15, characterized in that the non-linear elastic transmission means includes at least one layer of the medium through which the vibrator applies the vibrations generated.

38. A method as claimed in claim 16, characterized in that the non-linear elastic transmission means includes at least one layer of the medium through which the vibrator applies the vibrations generated.

\* \* \* \* \*